US012589436B2

(12) United States Patent (10) Patent No.: US 12,589,436 B2
Neumann et al. (45) Date of Patent: Mar. 31, 2026

(54) DEVICE AND APPARATUS

(71) Applicant: Nikon SLM Solutions AG, Luebeck (DE)

(72) Inventors: Karsten Neumann, Luebeck (DE); Arne Neef, Luebeck (DE); Bastian Lampert, Luebeck (DE); Daniel Brueck, Luebeck (DE)

(73) Assignee: Nikon SLM Solutions AG, Luebeck (DE)

( * ) Notice: Subject to any disclaimer, the term of this patent is extended or adjusted under 35 U.S.C. 154(b) by 654 days.

(21) Appl. No.: 17/632,387

(22) PCT Filed: Aug. 27, 2020

(86) PCT No.: PCT/EP2020/073925
§ 371 (c)(1),
(2) Date: Feb. 2, 2022

(87) PCT Pub. No.: WO2021/037954
PCT Pub. Date: Mar. 4, 2021

(65) Prior Publication Data
US 2022/0193785 A1 Jun. 23, 2022

(30) Foreign Application Priority Data

Aug. 27, 2019 (DE) ..................... 10 2019 122 906.5

(51) Int. Cl.
*B22F 12/90* (2021.01)
*B22F 10/85* (2021.01)
(Continued)

(52) U.S. Cl.
CPC ............. *B22F 12/90* (2021.01); *B22F 10/85* (2021.01); *B22F 12/45* (2021.01); *B22F 12/49* (2021.01);
(Continued)

(58) Field of Classification Search
CPC .......... B22F 12/90; B22F 10/85; B22F 12/45; B22F 12/49; B33Y 30/00; B33Y 50/02;
(Continued)

(56) References Cited

U.S. PATENT DOCUMENTS 3,850,525 A * 11/1974 Kaye ...................... G01N 21/47
356/73
2018/0154443 A1* 6/2018 Milshtein ................ B22F 12/41
(Continued)

FOREIGN PATENT DOCUMENTS

DE 102009016585 10/2010
DE 102013208651 11/2014
(Continued)

OTHER PUBLICATIONS

Japanese Patent Office, JP Examination Report for JP Patent Application No. 2022513202, Feb. 17, 2023.
(Continued)

*Primary Examiner* — Elizabeth M Kerr
*Assistant Examiner* — Simpson A Chen
(74) *Attorney, Agent, or Firm* — Williams Mullen; Thomas F. Bergert

(57) ABSTRACT

We describe a device for calibrating an irradiation system of an apparatus for producing a three-dimensional workpiece, the irradiation system comprising an irradiation unit for selectively irradiating an irradiation beam onto an irradiation plane, wherein the device comprises: a control unit configured to control the irradiation system to irradiate the irradiation beam onto the irradiation plane, and an optical detection unit coupled to the control unit, wherein the optical detection unit comprises an optical detector and an objective lens for optically detecting a portion of the irradiation plane, wherein the optical detection unit is configured to detect a position of a spot of the irradiation beam on the irradiation (Continued)

102 104 106

101

108

110

112

100 plane, wherein the objective lens is adapted to be arranged, with respect to an irradiation beam path of the irradiation beam, between the optical detector and an irradiation beam scanner of the irradiation system, wherein the optical detection unit is configured to detect the position of the spot of the irradiation beam in multiple focal planes based on a focal length of the optical detection unit being adjustable, wherein the optical detection unit is configured to output a signal to the control unit in response to the optical detection unit detecting the position of the spot of the irradiation beam on the irradiation plane, and wherein the control unit is configured to control the irradiation system based on the signal output from the optical detection unit to the control unit.

3 Claims, 5 Drawing Sheets

(51) Int. Cl.

| | |
|---|---|
| *B22F 12/45* | (2021.01) |
| *B22F 12/49* | (2021.01) |
| *B23K 26/03* | (2006.01) |
| *B23K 26/046* | (2014.01) |
| *B23K 26/082* | (2014.01) |
| *B23K 26/342* | (2014.01) |
| *B23K 31/12* | (2006.01) |
| *B33Y 30/00* | (2015.01) |
| *B33Y 50/02* | (2015.01) |
| *G01N 21/47* | (2006.01) |

(52) U.S. Cl.
CPC .......... *B23K 26/032* (2013.01); *B23K 26/046* (2013.01); *B23K 26/342* (2015.10); *B23K 31/12* (2013.01); *B33Y 30/00* (2014.12); *B33Y 50/02* (2014.12); *G01N 21/47* (2013.01); *B23K 26/082* (2015.10)

(58) Field of Classification Search
CPC .. B23K 26/342; B23K 26/032; B23K 26/046; B23K 31/12; B23K 26/082; G01N 21/47
USPC .................................................... 219/121.63
See application file for complete search history.

(56) References Cited

U.S. PATENT DOCUMENTS

| | | | |
|---|---|---|---|
| 2018/0186067 A1 | 7/2018 | Buller et al. | |
| 2018/0281067 A1* | 10/2018 | Small | B33Y 50/02 |
| 2018/0348492 A1* | 12/2018 | Pavlov | B29C 64/393 |
| 2019/0118481 A1* | 4/2019 | Brown | B22F 12/49 |
| 2020/0086557 A1* | 3/2020 | Klaußner | B29C 64/153 |

FOREIGN PATENT DOCUMENTS

| | | | | |
|---|---|---|---|---|
| DE | 102015102111 | | 8/2016 | |
| DE | 102018205403 | | 10/2019 | |
| EP | 1048441 | | 11/2000 | |
| EP | 3241668 | | 11/2017 | |
| EP | 3300885 | | 4/2018 | |
| EP | 3421225 | | 1/2019 | |
| EP | 3524410 | | 8/2019 | |
| EP | 3527352 | | 8/2019 | |
| JP | 2018-130764 | A | 8/2018 | |
| JP | 2018526254 | | 9/2018 | |
| JP | 2019137911 | | 8/2019 | |
| WO | 2015040185 | | 3/2015 | |
| WO | WO-2016128287 A1 * | | 8/2016 | B23K 26/067 |
| WO | 2017174226 | | 10/2017 | |
| WO | 2017187147 | | 11/2017 | |
| WO | 2018153687 | | 8/2018 | |
| WO | 2018191627 | | 10/2018 | |
| WO | 2019086250 | | 5/2019 | |
| WO | 2019149872 | | 8/2019 | |

OTHER PUBLICATIONS

China National Intellectual Property Administration, Examination Report for International Patent Application No. CN 202080062206.0, Sep. 8, 2023.
China National Intellectual Property Administration, Examination Report for International Patent Application No. CN 202080060505.0, Nov. 1, 2023.
International Search Report and Written Opinion for PCT/EP2020/073925, European Patent Office, Jan. 13, 2021.
Search Report for German Patent Application No. 10 2019 122 906.5, German Patent and Trademark Office, Apr. 8, 2020.
Partial International Search Report and Written Opinion for PCT/EP2020/073925, European Patent Office, Nov. 12, 2020.
Japan Patent Office, Office Action, Japanese Patent Application No. 2023-134145, Mar. 4, 2025.

* cited by examiner

DEVICE AND APPARATUS

CROSS-REFERENCE TO RELATED APPLICATIONS

This application is the U.S. national phase of international application PCT/EP2020/073925 filed on Aug. 27, 2020 which claims the benefit of German application DE 10 2019 122 906.5 filed on Aug. 27, 2019; all of which are hereby incorporated herein in their entirety by reference.

The present invention generally relates to a device for calibrating an irradiation system of an apparatus for producing a three-dimensional workpiece and an apparatus and system for producing a three-dimensional workpiece using an additive layer manufacturing technique.

In additive layering methods, workpieces are produced layer-by-layer by generating a sequence of solidified and interconnected workpiece layers. These processes may be distinguished by the type of raw material and/or the way of solidifying said raw material in order to produce the workpiece.

For example, powder bed fusion is a kind of additive layering process by which pulverulent, in particular metallic and/or ceramic raw materials, can be processed to three-dimensional workpieces of complex shapes. To that end, a raw material powder layer is applied onto a carrier and subjected to, for example, laser radiation in a site selective manner in dependence on the desired geometry of the workpiece that is to be produced. The laser radiation penetrating into the powder layer causes heating and consequently melting or sintering of the raw material powder particles. Further raw material powder layers are then applied successively to the layer on the carrier that has already been subjected to laser treatment, until the workpiece has the desired shape and size. Selective laser melting or laser sintering can be used in particular for the production of prototypes, tools, replacement parts or medical prostheses, such as, for example, dental or orthopedic prostheses, on the basis of CAD data.

On the other hand, fused deposition modeling or material jetting represent different types of additive layering processes. In this case, non-solidified raw material is supplied to a type of printing head which deposits said material onto a carrier where it then solidifies.

An important parameter of additive layer construction methods is the quality of the produced workpieces. As quality may be affected by various parameters, known solutions do not always achieve the desired quality.

Therefore, it is an object of the present invention in particular to improve quality of workpieces produced using an additive layer manufacturing technique. Image acquisition of the irradiation plane, calibrating an irradiation unit and checking the quality of the three-dimensional workpiece in particular during the manufacturing process may hereby be taken into account.

The invention is set out in the independent claims. Preferred embodiments of the invention are outlined in the dependent claims.

In a first aspect according to the present disclosure, there is provided a device for calibrating an irradiation system of an apparatus for producing a three-dimensional workpiece, the irradiation system comprising an irradiation unit for selectively irradiating an irradiation beam onto an irradiation plane, wherein the device comprises: a control unit configured to control the irradiation system to irradiate the irradiation beam onto the irradiation plane, and an optical detection unit coupled to the control unit, wherein the optical detection unit comprises an optical detector and an objective lens for optically detecting (at least) a portion of the irradiation plane, wherein the optical detection unit is configured to detect a spot of the irradiation beam on the irradiation plane, wherein the objective lens is adapted to be arranged, with respect to an irradiation beam path of the irradiation beam, between the optical detector and a deflector unit for deflecting a field of view of the detection unit across at least a part of the irradiation plane, wherein the optical detection unit is capable (configured) to detect the spot of the irradiation beam in multiple focal planes based on a focal length of the optical detection unit being adjustable, wherein the optical detection unit is configured to output a signal to the control unit in response to the optical detection unit detecting the spot of the irradiation beam on the irradiation plane, and wherein the control unit is configured to control the irradiation system based on the signal output from the optical detection unit to the control unit.

The irradiation plane may, in some examples, be understood as the field inside the processing camber, which is spanned by the possible irradiation points of the irradiation beams. The term irradiation plane was chosen because these irradiation points usually lie within a plane. Nevertheless, points lying within the irradiation range of the irradiation beams and not lying within a plane, e.g. points on a surface of a coater within the irradiation range, may also be understood as lying within the irradiation plane within the meaning of this application.

Detection of the spot of the irradiation beam on the irradiation plane may be understood as detection of a characteristic or property of the spot of the irradiation beam on the irradiation plane, i.e. a geometric characteristic or property like the shape and/or the position of the spot and/or an intensity distribution and/or the spectrum. Particularly the position of the spot of the irradiation beam on the irradiation plane, respectively the position of the spot of the irradiation beam within the field of view of the optical detection unit and/or the relative position of the spot in relation to another spot or feature, seems advantageous in view of the methods according to example implementations as described throughout the present disclosure. The position of the spot of the irradiation beam may thus be a position within the field of view of the optical detection unit, for example in relation to another spot or another feature arranged in the apparatus, such that the position of the spot does not necessarily need to relate to an absolute position of the spot. It should be noted that whenever subsequently stated, the position of the irradiation beam on the irradiation plane is only exemplary and may be understood as any characteristic or property of the spot of the irradiation beam on the irradiation plane, in particular as outlined above.

Throughout the present disclosure, any references as to a spot of the irradiation beam may relate, for example, to a single circular or otherwise shaped mark, or to pattern or other spatial arrangement of the irradiation beam. In some examples, such a pattern or spatial arrangement may be generated by appropriately scanning the irradiation beam across the irradiation plane.

It is particularly advantageous to arrange the objective lens, with respect to an irradiation beam path of the irradiation beam, between the optical detector and the deflector unit (e.g. irradiation beam scanner) since this allows in particular for a compact implementation for adjusting the focal length of the optical detection unit. Furthermore, a lens between the deflector unit and the irradiation plane may, to the contrary, disadvantageously result in a comparatively large lens having to be exploited, which may not be used in order to adjust the focal length of the optical detection unit, but may be used only for focal tracking.

Individual layers before and/or after irradiation of a layer for quality control may be achieved in view of high-resolution given the optical detector and the objective lens. The lens may be telecentric or endocentric. With sufficient magnification, online monitoring of a spot of the irradiation beam (for example a spot diameter of the irradiation beam) or monitoring of the focal position of an individual irradiation beam relative to the level of the irradiation plane may be accomplished.

In some examples, the optical detection unit is configured to detect (for example the position of) the spot of the irradiation beam on the irradiation plane based on one or more of: the irradiation beam being scattered off the irradiation plane, the irradiation beam being reflected from the irradiation plane, thermally induced heat radiation induced by the irradiation beam impinging on the irradiation plane, and emitted process light, in particular stemming from a melt pool induced by the irradiation beam impinging on the irradiation plane.

In some examples, the device further comprises a focal distance adjustment unit for adjusting a focal distance of the optical detection unit. Resolution of images of the irradiation plane may hereby be improved.

It is to be noted that, throughout the present disclosure, any references as to an "image" or the like may additionally or alternative be applicable to one or more image series and/or one or more videos.

In some examples of the device, a focal point of the objective lens is adjustable. By adjusting the focal point of the objective lens, the focal distance of the optical detection unit may be adjusted.

In some examples, the device further comprises a second lens having an adjustable focal length. By adjusting the focal length of the second lens, the focal distance of the optical detection unit may be adjusted.

In some examples, the device further comprises an image processing unit configured to stitch together multiple images of parts of the irradiation plane taken by the optical detection unit for obtaining an image of an entire surface of the irradiation plane. Resolution compared to taking a single image of the entire surface of the irradiation plane may be improved when taking multiple images of parts of the irradiation plane and stitching together these multiple images thereafter. Additionally or alternatively, one or more resolution enhancing software algorithms may be used, especially for so-called super-resolution imaging.

In some examples, the device further comprises a said irradiation system, wherein the optical detection unit is arranged off-axis with respect to the irradiation beam. The optical detection unit may hereby be configured to detect the irradiation beam spot based on the irradiation beam being scattered off the irradiation plane.

In some examples, the deflector unit comprises an irradiation beam scanner for scanning the irradiation beam across the irradiation plane.

We further describe an apparatus for producing a three-dimensional workpiece using an additive layer manufacturing technique, the apparatus comprising: an irradiation unit comprising at least one irradiation beam scanner, wherein the irradiation unit is configured to selectively irradiate at least one irradiation beam onto an irradiation plane, and an optical detection unit configured to optically detect a spot of the at least one irradiation beam on the irradiation plane, wherein the optical detection unit comprises an optical detector, in particular a camera, and a focal length adjustment, in particular an objective lens, for adjusting a focal length of the optical detection unit, wherein the focal length adjustment is arranged, with respect to an irradiation beam path of one of the at least one (or more) irradiation beam(s), between the optical detector and one of the at least one (or more) irradiation beam scanner(s), and wherein the optical detection unit is capable to detect the spot of the at least one irradiation beam in multiple focal planes based on the focal length of the optical detection unit being adjustable.

Some or all of the components of the device for calibrating the irradiation system may be incorporated into the apparatus for producing the three-dimensional workpiece. In particular, the optical detection unit of the apparatus may comprise an optical detector and an objective lens for optically detecting a portion of the irradiation plane.

In some examples, the optical detection unit is arranged off-axis with respect to the irradiation beam path of the at least one irradiation beam from the irradiation unit to the irradiation plane for detecting light stemming from the at least one irradiation beam being scattered off the irradiation plane. When multiple irradiation beams are scanned over the irradiation plane, the optical detection unit may be arranged off-axis with respect to the irradiation beam path of one (or more) of the irradiation beams from the irradiation unit (or corresponding irradiation unit used to generated the irradiation beam) to the irradiation plane, while it may be arranged on-axis with respect to one or more other irradiation beams paths/scanners. Additionally or alternatively, the optical detection unit is further configured to detect (for example the position of) the spot of the irradiation beam on the irradiation plane based on one or more of: the irradiation beam being reflected from the irradiation plane, thermally induced heat radiation induced by the irradiation beam impinging on the irradiation plane, and emitted process light, in particular stemming from a melt pool induced by the irradiation beam impinging on the irradiation plane.

In some examples, the apparatus may comprise a focal distance adjustment unit for adjusting a focal distance of the optical detection unit. Additionally or alternatively, the focal point of the objective lens is adjustable. Additionally or alternatively, the apparatus comprises a second lens (of the optical detection unit) having an adjustable focal length. Additionally or alternatively, the apparatus comprises an image processing unit configured to stitch together multiple images of parts of the irradiation plane taken by the optical detection unit for obtaining an image of an entire surface of the irradiation plane.

In some examples of the apparatus, the irradiation unit is configured to irradiate a first said irradiation beam and a second said irradiation beam onto the irradiation plane, wherein the optical detection unit is configured to optically detect a first said spot of the first irradiation beam on the irradiation plane and a second said spot of the second irradiation beam on the irradiation plane, wherein the apparatus further comprises a calibration unit coupled to the optical detection unit and the irradiation unit, and wherein the calibration unit is configured to calibrate the irradiation unit for controlling the first irradiation beam and the second irradiation beam relative to each other based on the optical detection, by the optical detection unit, of the first spot and the second spot on the irradiation plane. This may allow for precisely calibrating the first irradiation unit/beam relative to the second irradiation unit/beam given the high-resolution optical detection unit.

In some examples, the apparatus further comprises a first said irradiation beam scanner for scanning the first irradiation beam over the irradiation plane based on a first irradiation beam pattern, and a second said irradiation beam scanner for scanning the second irradiation beam over the irradiation plane based on a second irradiation beam pattern, wherein the optical detection unit is configured to: detect the first irradiation beam pattern and the second irradiation beam pattern, compare the first irradiation beam pattern with the second irradiation beam pattern, and output a comparison signal based on said comparison, and wherein the apparatus is configured to calibrate the irradiation unit based on the comparison signal for controlling the first irradiation beam and the second irradiation beam. The first and second irradiation patterns may, in some examples, be concentric circles, lines, alternating lines, a nonius pattern.

In some examples, the comparison of the first irradiation beam pattern with the second irradiation beam pattern is performed using one or more resolution enhancing software algorithms.

In some examples of the apparatus, the comparison of the first irradiation beam pattern with the second irradiation beam pattern comprises determining (i) a trajectory of an irradiation intensity-weighted mean value of the first and second irradiation beams and/or (ii) a peak intensity of the first and second irradiation beams. Calibrating the first irradiation unit/beam relative to the second irradiation unit/beam may hereby be precisely performed.

In some examples of the apparatus, the optical detection unit is configured to detect the spot of the irradiation beam on the irradiation plane in multiple focal planes for the same viewing direction of the optical detection unit. Resolution may hereby be improved for multiple focal planes for the same viewing direction of the optical detection unit.

In some examples of the apparatus, the optical detection unit is configured to determine a focused area of an image of the irradiation plane in each of the multiple focal planes, and wherein the apparatus is configured to determine three-dimensional information in relation to a surface of the irradiation plane based on the determined focused area of each of the multiple focal planes. This may allow for precisely determining quality of the three-dimensional workpiece. In some examples of the apparatus, the optical detection unit is configured to generate a hyperfocal image of the irradiation plane.

In some examples, the apparatus further comprises an image processing unit configured to stitch together multiple images of parts of the irradiation plane taken by the optical detection unit for obtaining an image of an entire surface of the irradiation plane. The multiple images may be taken based on different views/angles and/or at different times. High-resolution images of the entire surface (and/or smaller parts) of the irradiation plane may hereby be obtained. This process may also be performed with low-resolution cameras having a resolution below a predefined threshold.

In some examples of the apparatus, the irradiation unit is configured to irradiate an irradiation spot and/or pattern onto the irradiation plane, and wherein the image processing unit is configured to align images in which the irradiation spot and/or pattern are visible (i.e. observable in the images) based on aligning the irradiation spot and/or pattern in the respective ones of said images. This allows for improving the image of the entire surface of the irradiation plane.

In some examples, the irradiation beam scanner is configured to scan the irradiation beam and/or an irradiation spot and/or pattern onto the irradiation plane, wherein the apparatus is configured to determine a three-dimensional surface of at least a part of the irradiation plane based on a position of the scanner relative to the irradiation plane using triangulation. No further devices may be needed in order to control, for example, a level of the irradiation plane, i.e. a distance between the optical detection unit and/or the irradiation unit and the irradiation plane. Adjustments may be made in particular to the irradiation unit without mechanical changes, as long as software-based adjustments are possible.

In some examples, the apparatus comprises a plurality of irradiation beam scanners, and wherein the apparatus is configured to determine the three-dimensional surface of at least a part of the irradiation plane based on the position of each of the irradiation beam scanners relative to the irradiation plane using triangulation. In some examples, the apparatus is configured to determine a height of the irradiation plane based on the position of each of the scanners and a point of intersection of irradiation beams being scanned over the irradiation plane by the respective scanners using triangulation.

In some examples of the apparatus, the irradiation unit is configured to irradiate (in particular with reduced power and/or for light spot detection) an elongated and/or stripe pattern onto the irradiation plane, and wherein the optical detection unit is configured to detect a position of the elongated and/or stripe pattern on the irradiation plane. The irradiation plane and/or a substrate surface may hereby be precisely gauged.

In some examples, the device or apparatus comprises a reference plate comprising one or more markings with known positions, wherein the device or apparatus is configured to: determine a position, in particular in a first direction, of a said marking with respect to a pattern projected, in particular generally in a second direction which is different from (for example perpendicular or substantially perpendicular to) the first direction, by a scanner onto said marking, and calibrate said irradiation beam scanner based on the determined position. In some examples, the pattern comprises one or more lines stemming from an irradiation beam being scanned by the scanner over the reference plate.

We further describe a system for producing a three-dimensional workpiece using an additive layer manufacturing technique, the system comprising: a plurality of deflection units, wherein at least one of the deflection units is configured to divert an optical path towards a surface of the system, in particular a test sample, and/or a material solidified and/or to be solidified by the system using the additive layer manufacturing technique, and a sensor configured to detect the surface and/or the material via a first one of the deflection units, one or more irradiation devices configured to generate, for projection onto the surface and/or the material, one or more irradiation spots and/or patterns, wherein a first one of the irradiation spots and/or patterns is deflectable via a second one of the deflection units onto the surface and/or the material, and/or a second one of the irradiation spots and/or patterns is deflectable via a third one of the deflection units onto the surface and/or the material, and/or the system comprises at least one calibration mark in a detection range of the sensor detecting the surface and/or the material via the first one of the deflection units, and wherein the system is configured to: detect, via the sensor detecting the surface and/or the material via the first one of the deflection units, a first characteristic, on the surface and/or the material, of the first irradiation spot and/or pattern, and/or detect, via the sensor detecting the surface and/or the material via the first one of the deflection units, a second characteristic of the second irradiation spot and/or pattern, and/or detect, via the sensor detecting the surface and/or the material via the first one of the deflection units, a third characteristic of the calibration mark; and wherein the system is further configured to: determine a correlation of the first characteristic and the second characteristic and/or the third characteristic, in particular a relative distance between the first irradiation spot and/or pattern and of the second irradiation spot and/or pattern and/or between the first irradiation spot and/or pattern and the calibration mark, and calibrate the second one of the deflection units and/or the third one of the deflection units, in particular relative to each other, based on the determined correlation of the first characteristic and the second characteristic on the surface and/or the material and/or calibrate the second one of the deflection units based on the determined correlation of the first characteristic on the surface and/or the material and the third characteristic.

The surface may in particular be an internal surface of the system, for example a test sample surface of a test sample and/or a carrier on which material is to be solidified using the additive layer manufacturing technique and/or a surface of a coater for preparing a layer of material to be solidified.

In some examples, the material is a powder material.

In some examples, the sensor is a camera.

In some examples, the system may further comprise one or more calibration marks arranged on or near the irradiation plane within the field of view of at least one sensor deflected via at least one of the deflection devices.

It is to be noted that the term deflection unit and scanner may be used interchangeably throughout the entire disclosure.

In some examples, a pattern is formed by scanning a spot/irradiation beam across the surface and/or material using a said deflection unit.

It may be particularly advantageous to not include the first deflection unit in the calibration process since the focus of the observed surface via the sensor may be adjusted irrespectively and independently from an irradiation beam which may be deflected via the first deflection unit.

In some examples, the system is configured to correlate a said spot and/or pattern with an irradiation beam stemming from a said irradiation device based on one or more of: a geometry and/or a dimension and/or an intensity and/or an intensity distribution of the spot and/or pattern being unique to a corresponding, respective one of the irradiation devices and/or corresponding, respective one of the deflection units, a time period over which the irradiation beam is generated, and a position of an area or part of the surface and/or the material in or on which a said spot and/or a said pattern is expected. This may allow for ease of correlating a spot and/or pattern with an irradiation beam.

In some examples, the system is configured to calibrate the plurality of deflection units using a reference position of a said spot and/or pattern on the surface and/or the material, wherein the reference position is based on one or more of: a predetermined one of said spots and/or patterns being deflected by a predetermine one of the deflection units, wherein the system is configured to compare, for said calibration, an actual and a target distance between the reference position and a said position of another one of said spots/and or patterns; a first said position of a first spot and/or pattern with a lowest first deviation from a target mean relative distance to other positions of other spots and/or patterns; and a second said position having a lowest second deviation from a target position on the surface and/or the material. The calibration may hereby be performed particularly precisely.

In some examples, one of the irradiation devices is configured to generate a third said irradiation spot and/or pattern for projection onto the surface and/or the material via the first one of the deflection units, and wherein an observation path for observing the surface and/or the material by the sensor and an irradiation beam path of said third irradiation spot and/or pattern form an angle therebetween, and wherein the angle is different from zero. This may allow for the observation to not be centered on the irradiation beam spot or pattern, such that the observation may not be negatively influenced by the beam or pattern being emitted back to the sensor.

These and other aspects of the invention will now be further described, by way of example only, with reference to the accompanying figures, in which:

FIG. 1 shows a schematic illustration of a system according to some example implementations as described herein;

FIGS. 2a to d show schematic illustrations of patterns according to some example implementations as described herein;

Figure 1:
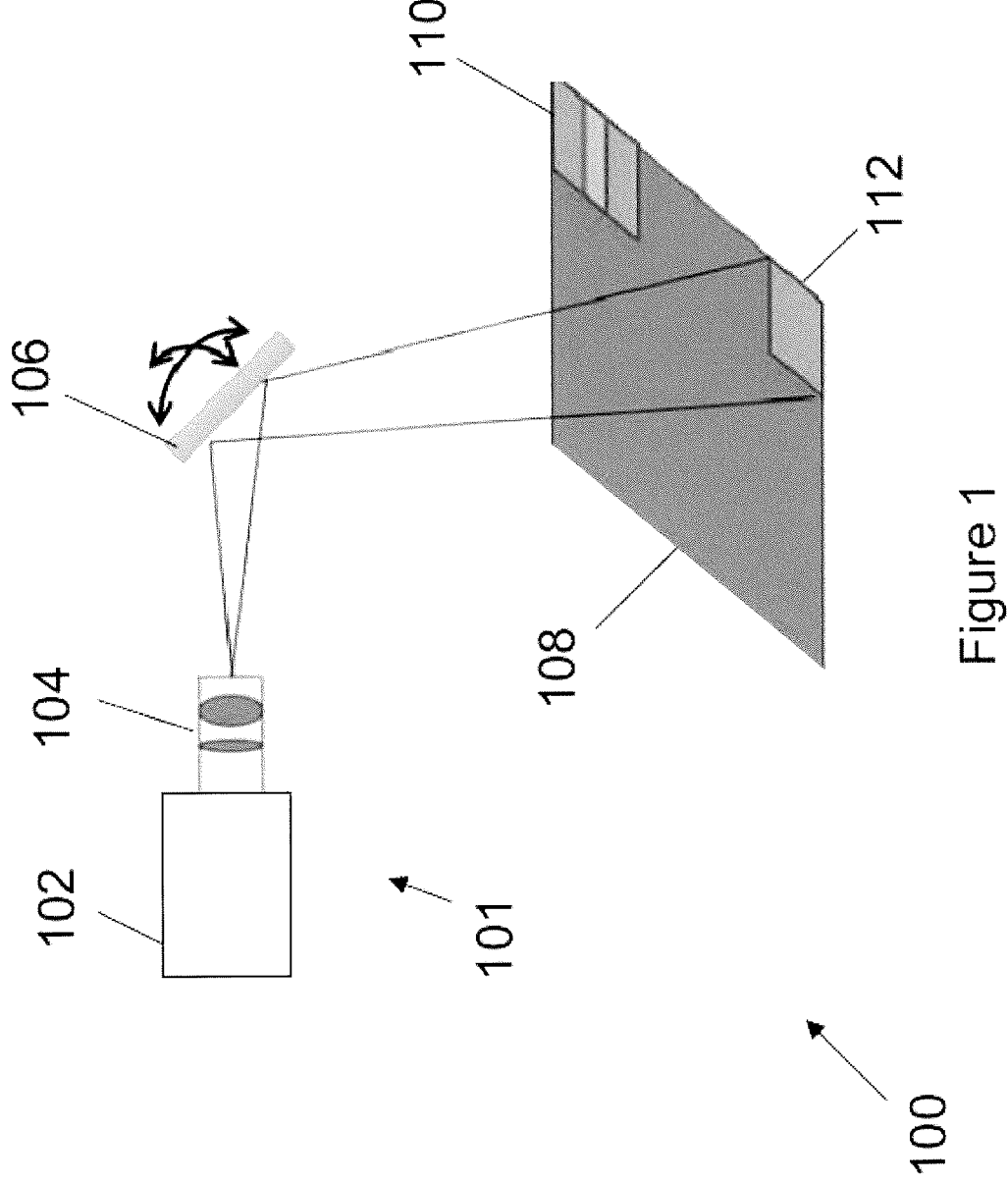

The present disclosure relates, inter alia, to high-resolution, flexible image capturing over large (for example 50 cm×50 cm×50 cm) image fields.

The camera system of quality control systems used thus far for larger irradiation planes or for more demanding tasks such as hybrid construction has its limits in terms of resolution and calibration. This problem may be avoided by a high-resolution lens and acquisition of partial images (taken at different points in time and/or of different locations and/or different viewing angles) which may be combined into a complete image using image processing software (stitching).

Examples of the device and apparatus as described herein provides for high-resolution control of individual layers used in the additive layer manufacturing process before/after irradiation (for example laser) processing for quality control.

With sufficient magnification, online monitoring of the spot diameter and/or monitoring of the focal position of the individual irradiation units (for example lasers) relative to the irradiation plane/level are achieved.

Examples of the device and apparatus as described herein allow for high-precision detection of laser spot positions on the irradiation plane. This may be used in order to align two irradiation units (for example lasers) to each other.

Measurements of the position of components on the building platform may be performed using examples of the device and apparatus as described herein.

The detection of laser spot positions on the irradiation plane and measurements of the position of components on the building platform enable exact positioning of lasers relative to existing components, for example in hybrid construction.

During repair and/or hybrid construction, existing components may be mounted on a substrate plate, on which further layers may then be built using the additive layer manufacturing process. For this process, the layers to be applied may need to precisely match the shape and/or position and/or alignment of these existing components. For this purpose, the exact position of the existing components relative to the device/apparatus and/or scanner coordinate system may need to be determined after installation in the device/apparatus, and the model (for example CAD model) for the construction job may need to be individually adapted accordingly. This process may be identical to finding the calibration structure, only in that the coordinates determined in this way may, in some examples, not (or not only) be used to adjust the calibration of the control unit/scanner, but (also) to determine the exact position and/or alignment of components mounted on the substrate plate and then use these to correct the model for the build job.

Examples according to the present disclosure may also be used to determine the position of one or more markings on a reference plate. If a correspondingly manufactured reference plate is inserted (for example flat glass ceramic with low thermal expansion such as Nextrema® or Zerodur®) on which corresponding markings are applied (for example grids of holes and/or recesses and/or elevations), an exact measurement of these markings can be used to calculate an image field correction file for the respective scanner, and no samples need to be burned and evaluated.

Examples of the device and apparatus as described herein allow for taking an entire image of the irradiation plane from multiple images taken by an optical detection unit (for example camera), whereby each of the multiple images contains only a respective part of the entire irradiation plane.

Examples of the device and apparatus as described herein may comprise a camera with a lens for high-resolution imaging of a part of the irradiation plane. The lens may be telecentric or endocentric.

The device/apparatus may further comprise a focal distance adjusting device/unit, for example an objective with an adjustable focus and/or an additional lens with an adjustable focal length.

The device/apparatus may further comprise a device or unit for computer-controlled alignment of the device/system. In some examples, the alignment device/unit comprises a pivot system (pan/tilt) for the optical detection unit (for example camera) with its lens, and/or a mirror electrically adjustable by two angles, and/or a system of at least two mirrors (for example x/y galvanometer scanners).

The device/apparatus may further comprise a system or unit for controlling the optical detection unit (for example camera)/lens/alignment.

Image acquisition and processing may be performed by the optical detection unit. The optical system of the device and/or apparatus may hereby be aligned. If necessary, alignment of the optical system may be rectified by means of previously recorded correction or calibration data.

The focus may be set and images for several focal planes (focus stacking) may be acquired with the same viewing direction of the system.

Individual images may be combined in order to form an image of the entire building platform. Alternatively or additionally, individual images may be combined for the same image position and different focal spot positions (time combination).

Multiple optical detection units (for example multiple cameras) may be used in order to cover an enlarged area/surface which may not be coverable via a single optical detection unit.

The focus setting and combination of individual images may be combined in order to enable the calculation of depth information and/or the generation of hyperfocal images (by selecting the sharpest image for the respective image section).

Furthermore, the system or unit for controlling the optical detection unit (for example camera)/lens/alignment may be used in order to detect component positions and errors.

The alignment of the viewing direction may be realized, for example, via one or more galvanometer scanners with sufficient precision.

A correction of the perspective distortion of the optical camera(s) may be performed with the help of appropriate calibration plates both over the entire construction field plane, i.e. also for individual selected areas (i.e. the partial images at previously defined positions) and by appropriate interpolation for any points.

If a stitching of single images is not possible due to, for example, missing structures/contrasts, for example, with a freshly coated layer, a spot or a pattern may be projected via the existing scanners using the irradiation unit (for example IR laser) (at low power) or the guide beam. If this light pattern is visible in two images to be merged, it can be used to align images of adjacent areas. Taking one picture per viewing angle with and without light patterns allows images to be stitched together without disturbing light patterns in the result.

Acquisition of images for different focal lengths of the lens or lenses before the known information of the focus position and an image processing that recognizes the sharp image areas allows the calculation of three-dimensional information. This can be useful for hybrid construction if the exact position and height of components on the platform is unknown.

FIG. 1 shows a schematic illustration of a system 100 according to some example implementations as described herein.

In this example, a variant with a mirror deflection is shown.

The system 100 comprises a device 101, which comprises, in this example, a camera 102 and objective lenses 104 with an adjustable focus.

The system 100 further comprises a movable deflection unit 106, such as an x/y galvanometer scanner.

Images of the substrate plate 108 or the irradiation area, which is larger than the captured image area, can be taken with the camera 102, the objective lenses 104 and the movable deflection unit 106.

The schematic illustration further shows two at least partially overlapping image areas 110 for stitching and a currently imaged area 112. In some examples, the areas 110 may not overlap with each other, but border directly on each other.

The system allows for higher spatial resolution over the entire image field compared to a lens control system camera (having the same or similar optical parameters, such as resolution and/or chip size etc.) which may take a single image of the entire image field.

The optical system is simpler compared to inline cameras in or behind the optical system of the scanner, whereby inline cameras may require, for example, an additional beam splitter.

Furthermore, projected light patterns from existing laser scanners allow these scanners to be aligned with each other or with components on the platform.

Moreover, the focal position information allows hyperfocal images of the entire plate as well as the extraction of depth information (three-dimensional information).

It is to be noted that, with selective laser melting or sintering systems with several scanner units, drifts can occur during a build job (in one or more of the three spatial directions), so that the originally aligned construction fields of the individual scanner optics show an offset in the processing plane (x/y). This may lead to offsets of the components in transition areas of two optics. It has been difficult thus far to check and correct these drifts over the entire irradiation plane during the ongoing construction process. Examples of the device and apparatus as described herein may allow for controlling and correcting the relative offset in x/y calibrated scanner optics in the overlap area. This may be particularly advantageous in systems with a large number of optics, for example 4 or more optics (in some examples, two optics are used), and large construction areas of, for example, 0.5 m×0.5 m.

A high-resolution camera system may be used to align the lasers with each other directly in the process at the powder level. A relatively lower-resolution camera system may be used, whereby predictions may be less accurate and/or precise information may be obtained for a smaller image area only.

The camera may only image a small part of the construction/irradiation plane that lies within the common area of the two optics to be adjusted and is focused for this object field. Alignment may be performed by means of a pivot and/or upstream movable mirror and/or x/y deflection unit (scanner). A movable lens, a lens with electronically adjustable focal length or an autofocus lens may be used for focusing. The scanner and/or focusing optics may be a laser scanner (inline camera). In some examples, an inline camera may be associated with a scanner which serves to calibrate two other scanners with respect to each other.

The alignment of the scanners with respect to each other is controlled, in this example, by the two scanners simultaneously, sequentially or alternately projecting light of a suitable pattern onto the powder plane.

For the projection, either the beam of the irradiation unit (for example fiber laser) set to low power, possibly modulated as a pulse sequence, or its guide beam may be used. The intensity may be so low that no relevant melting processes may take place in the powder bed.

The camera may record this pattern as a video or sequence of individual images. By means of adapted image processing software, the line segments (each stemming from a corresponding, respective projected light spot which is followed between the video or sequence of individual images) of the respective lasers may be combined to an overall pattern and evaluated using one or more resolution enhancing software algorithms. The exact trajectory of the centroid (i.e. the intensity weighted mean value) or the peak intensity of the laser beams may be evaluated.

In this process, the image readout rate and/or image exposure time may be coupled with the traversing speed of the laser.

The application of this procedure at the beginning of a build job may provide the initial values which can be kept constant by successive control during the running process and corresponding adjustment of the offset.

The check may be carried out in pairs for all scanner optics. Depending on the overlap, all scanner optics may be referenced to a single scanner optics, to a few scanner optics or only to the respective neighboring scanner optics.

FIGS. 2a to d show schematic illustrations of patterns according to some example implementations as described herein.

Figures 2A, 2B, 2C, 2D:
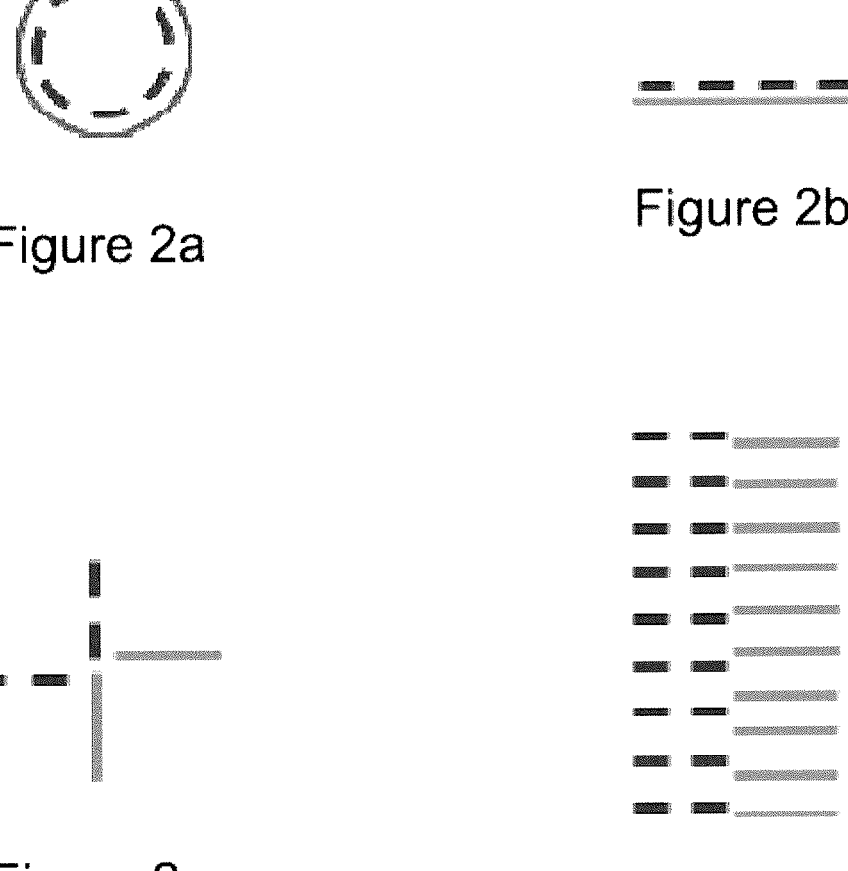

In FIG. 2a, concentric circles or polygons with evaluation of the respective center points of the concentric circles or polygons are shown.

In FIG. 2b, overlapping straight lines (recorded one after the other for optics 1 and 2) are shown. A perfect overlap is seen in the top part of FIG. 2b, while a bad overlap occurs between the lines in the bottom part of FIG. 2b.

In FIG. 2c, spatially alternating patterns with evaluation of the offset at the intersections is shown.

In FIG. 2d, opposite or overlapping, parallel lines forming a vernier (nonius), evaluation is performed with regard to the best fitting pair analogously to the known vernier scale. In this example, the best overlap can be seen in FIG. 2d for line 3 from the top.

As will be appreciated, other patterns than the ones shown in FIGS. 2a to d may be used.

The device/apparatus enables a method for camera and image analysis supported evaluation of the irradiation beam (for example laser) spot positions directly in the powder bed.

Cameras which map the entire working plane could not provide the required measurement accuracy due to insufficient spatial resolution and depth of field. On-Axis cameras in the scanner systems may not be suitable, at least not if they belong to one of the two scanners to be calibrated. Another lens for focusing may be needed. If the camera moves together with one of the laser spots, then the evaluation according to the above suggested patterns may not be possible as a spot may seem to stand still. This may also cause problems with exposure times: the pixels of the still spot may accumulate more light than those of the other scanner.

Compared to the previously used control of the image field correction by a burn off foil, the method can also be used in the process for manufacturing the three-dimensional workpiece without any further aids.

The use of a separate camera with a focusable lens and a small higher-resolved image field provides the necessary optical resolution and flexibility and offers numerous possibilities for optimization through the use of optical filters (band pass, polarization etc.) and image processing.

The image field correction of the scanners may take place in a certain z-plane, which is determined, for example, by the position of the image field correction plate used or the layer ablated by the laser. After recording the image field correction data, it may need to be ensured at a later stage that the powder surface to be processed lies as exactly as possible in this (virtual) plane each time the coater is set up. The position of this plane may ultimately be determined by the position of the optical units, not by the building platform. Especially with large construction areas, it may be difficult to find sufficiently precise reference points for the adjustment of the coater in the surrounding of the build platform. It may be desirable to set up or check the system at the start of a construction job without any further measuring or auxiliary equipment. It should be noted that only the powder surface created by the coating process relative to the optics may be important. The position of the substrate plate may only be relevant for the first layer of the three-dimensional workpiece.

The arrangement may comprise, in this example, at least two scan optics, which have an overlapping area or can process directly adjacent areas, and a camera system with sufficient resolution.

The procedure may allow for checking the height of the substrate plate and/or powder surface relative to the plane in which the image field correction was performed.

It may further allow software correction for deviations in the z-position or inclinations of the current powder level to the calibration level: No mechanical adjustment work may be required if the errors are to be compensated for by the software.

The position of the calibration plate or the powder surface relative to the coordinate system of the optics is relevant for image field correction. It may be presupposed that the calibration of the optics is still correct when setting up the machine before a new construction job). Temperature drifts and the like can be excluded before the start.

The scanner optics themselves may be used in order to check the position for correction/adjustment purposes.

The height of the correction plate or the powder plane may be determined by triangulating the beam paths of two optics and their intersection point on the plane. The position of the laser beams on the current plane may be observed by means of a camera system.

The camera may only image a small part of the working plane that lies within the common area of the two optics and is focused for this object field. Alignment can be performed by means of a pivot or upstream movable mirror or x/y deflection unit (scanner). A movable lens, a lens with electronically adjustable focal length or an autofocus lens may be used for focusing.

Figure 3:
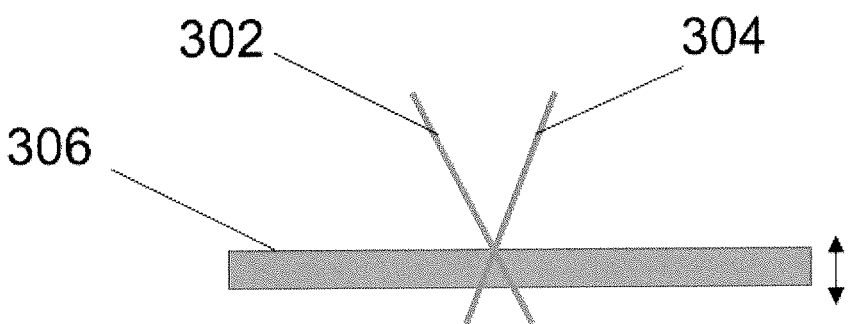
FIG. 3 shows a schematic illustration of irradiation (laser) beams and a irradiation plane according to some example implementations as described herein.

FIG. 3 shows a schematic illustration of laser beams and a irradiation plane according to some example implementations as described herein. During image field calibration, at least two scanners may be set up in such a way that their beams meet at a point on the exposure surface. For this purpose, the spots themselves or suitable patterns may be measured and projected through the respective optics.

For this purpose, the processing irradiation unit (laser) itself (with reduced power) or the guide beam may be used.

When calibrating the image fields, the exact scanner angles/positions for this image may be saved.

Subsequently, it is possible to measure the respective positions and/or scan angles of the two beams for deviating z-heights, which positions and/or scan angles may be saved.

The camera may record the location of the spots and/or the patterns as video and/or a sequence of individual images. By means of adapted image processing software, the projected line segments of the respective lasers may be combined to an overall pattern and the exact trajectory of the centroid (i.e. the intensity weighted mean value), or the peak of the irradiation (laser) beams may be evaluated.

Generally, in any example implementations, in particular in which the trajectory of the centroid or the peak of the irradiation beams is evaluated, methods may be used to increase accuracy (for example fit and/or peak detection and/or averaging and/or phase-shifting and/or pixel-shifting).

Before the start of a construction job, the stored values can be used to move exactly to the same z-position again and the coater can be set accordingly.

Alternatively or additionally, at the start of construction, a layer of powder may be applied with the current setting of the coater and the relative position of the powder surface to the calibration plane may be determined with the aid of the irradiation (laser) triangulation and the values determined during calibration for different z-heights. In this case, re-adjustment of the coater can be dispensed with if the deviation remains within the tolerance to be defined.

Patterns which may be used correspond to those as shown in FIGS. 2a to d.

The method directly uses the existing scanners to determine the height according to the triangulation principle.

Since only the relevant measured variables (position of the powder plane relative to the scanner coordinate system) remain in the measuring chain, all other sources of error may be excluded.

The procedure can be automated, simplifies the operation of the machine and eliminates subjective influences during setup by the operator.

The irradiation plane may be surveyed in a three-dimensional way via laser line projection or structured light projection. For quality assurance during the ongoing construction process and to protect the coater in the event of a defect in the powder coating components, a three-dimensional measurement of the powder or substrate surface can be used.

Uniform coating with powder may be ensured.

Control of the current layer for protruding parts (for example detachment of supports due to thermal stresses) may be achieved.

With sufficient resolution in z, a height profile of the powder surface may be created on which the contours of the irradiated (for example lasered) and thus compacted surfaces become visible and verifiable.

As outlined further above, the exact position of existing components relative to the device/apparatus and/or scanner coordinate system may need to be determined after installation in the device/apparatus, and the model (for example CAD model) for the construction job may need to be individually adapted accordingly. This process may be identical to finding the calibration structure, only in that the coordinates determined in this way may, in some examples, not (or not only) be used to adjust the calibration of the control unit/scanner, but (also) to determine the exact position and/or alignment of components mounted on the substrate plate and then use these to correct the model for the build job.

Figure 4:
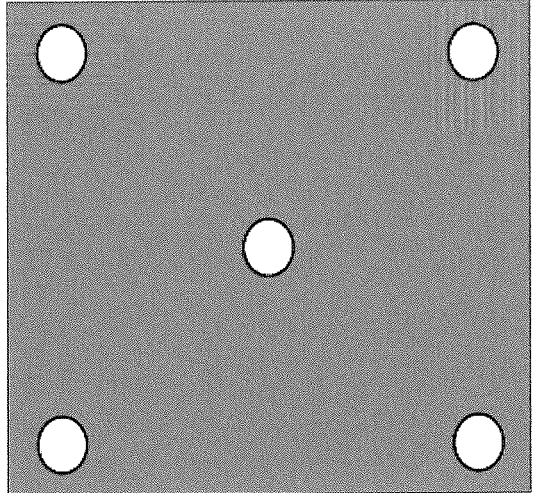
FIG. 4 shows a schematic illustration of an arrangement according to some example implementations as described herein.

FIG. 4 illustrates how laser line projection on a reference plate may be used for feature detection. In this example, the reference plate has a grid of circles at precisely known positions. The circles may represent a drill in the reference plate. The top left circle in the schematic illustration is superimposed with a series of horizontal lines projected by the scanner to be calibrated. By means of image analysis algorithms the vertical position of the hole with respect to the line pattern can be determined. A series of patterns with shifted vertical positions may be used in order to improve resolution.

The top right circle shows the same for a vertical line pattern which is used to determine the horizontal position of the pattern with respect to the circle.

This procedure does not require high time resolution of the camera system, as the position is determined perpendicular to the laser spot movement. No real time information of the spot position is required.

Generally, using more than one scanner, accuracy of the measurement may be sufficient to determine the position of the substrate plate (or powder) relative to the optics, without making too high demands on the quality of the camera optics. As outlined above, the height of the substrate plate or powder plane may be determined by triangulating the beam paths of two optics and their intersection point on the plane.

The system comprises, in this example, a camera (for example a lens control system camera), which serves as the detector. Together with the scanner, this forms an angle that can be used for triangulation. As a light source, the irradiation unit (for example fiber laser) can be used at low power, the guide laser, or both in succession. In addition, the use of an additional strip light projector may also be conceivable.

Any pattern may be projected using the scanner.

During the exposure time of the camera, only the part of the pattern scanned during this time may be captured so that the entire stripe image on the surface results from the image processing in which the captured patterns are joined together. With multi-laser machines, the projection may take place with several scanners simultaneously or successively, whereby the different angle between camera, object and respective scanner may further improve resolution. The pattern may, in some examples, be captured in single images which may then be stitched together, or the exposure time may be longer while the distance covered in an image is longer.

Compared to a single image of the layer before and/or after coating, this process provides for improved spatial resolution. Due to the structured illumination, no contrast of the surface may be necessary for the measurement of the surface contour.

Figure 5:
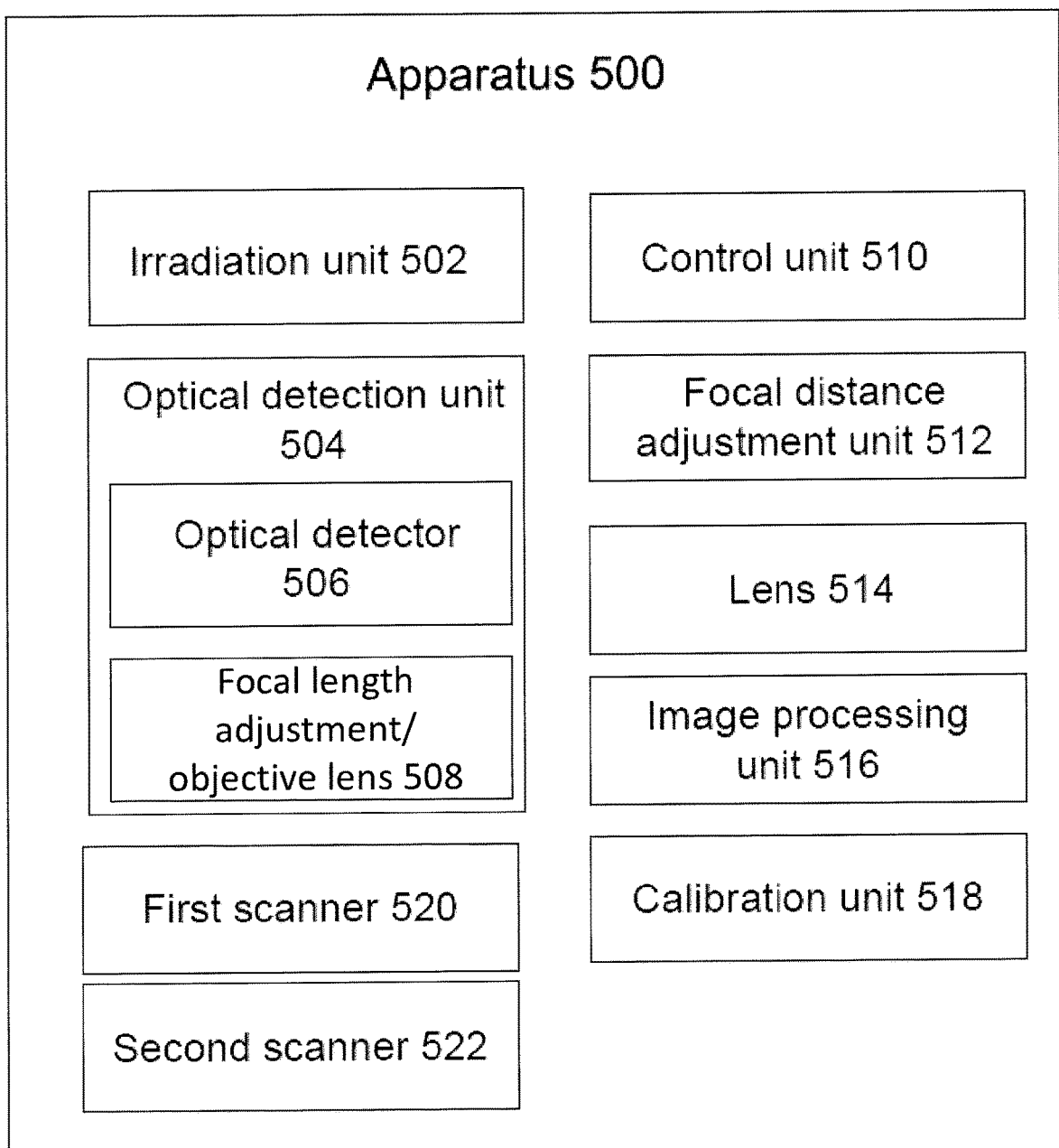
FIG. 5 shows a schematic block diagram of an apparatus according to some example implementations as described herein.

FIG. 5 shows a schematic block diagram of an apparatus 500 according to some example implementations as described herein.

In this example, the apparatus 500 comprises an irradiation unit 502 for selectively irradiating an irradiation beam onto an irradiation plane. In some examples, the apparatus comprises a plurality of irradiation units 502.

The apparatus 500 further comprises an optical detection unit 504 which comprises an optical detector 506 and a focal length adjustment (for example an objective lens) 508 for adjusting a focal length of the optical detection unit 504, wherein the optical detection unit 504 is configured to optically detect a portion of the irradiation plane.

The apparatus 500 further comprises a control unit 510 which is configured to control the irradiation system/irradiation unit 502 in order to irradiate the irradiation beam onto the irradiation plane.

The apparatus 500 further comprises a focal distance adjustment unit 512 for adjusting a focal distance of the optical detection unit 504. The focal distance adjustment unit 512 may be integral to the optical detection unit 504.

The apparatus 500 further comprises an objective lens 514 which has an adjustable focal length. The objective lens 514 may be integral to the optical detection unit 504.

The apparatus 500 further comprises an image processing unit 516 which is configured, for example, to stitch together multiple images of parts of the irradiation plane taken by the optical detection unit 504 for obtaining an image of an entire surface of the irradiation plane. In some examples, the image processing unit 516 may stitch together images taken at different times and/or taken at different locations and/or from different views.

The apparatus 500 further comprises a calibration unit 518 which is configured to calibrate the irradiation unit 502, for example for controlling two irradiation beams relative to each other based on an optical detection of respective irradiation spots on the irradiation plane by the optical detection unit 504. In order to control the respective irradiation beams, the apparatus 500 further comprises a first scanner 520 and a second scanner 522. In some examples, the first scanner 520 and/or the second scanner 522 may be part of the irradiation unit 502.

Figure 6:
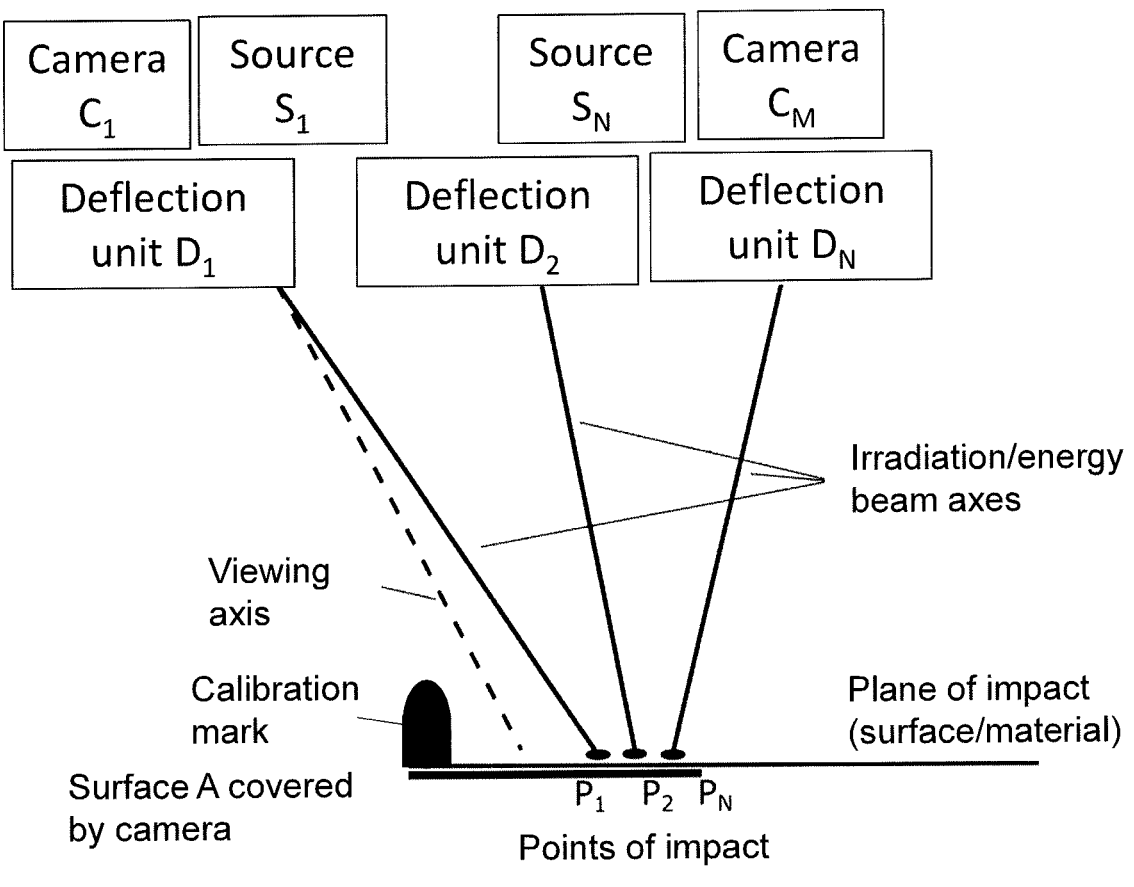
FIG. 6 shows a schematic illustration of a system according to some example implementations as described herein.

FIG. 6 shows a schematic illustration of a system according to some example implementations as described herein.

Figure 7:
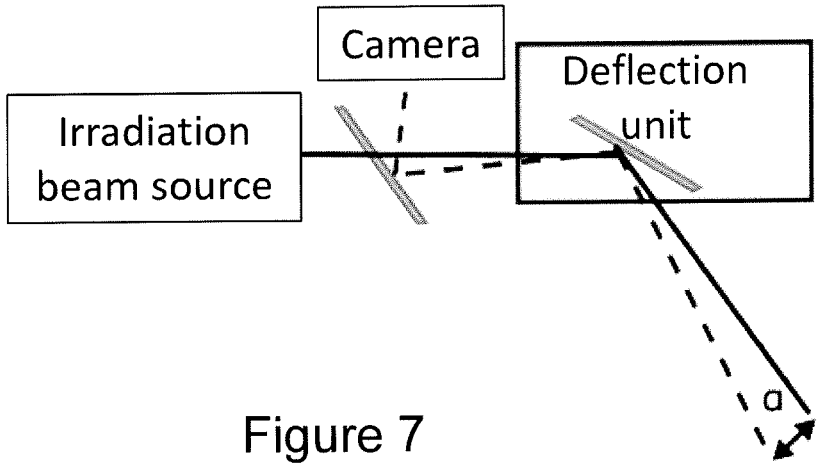
FIG. 7 shows a schematic illustration of a system according to some example implementations as described herein.

In this example, a system, in particular a selective laser melting system, is equipped with N deflection units (only three are shown for simplicity) (and energy beam sources, whereby it is also possible for several or all deflection units to use the same energy beam source) and M (<=N) sensors (in particular spatially resolved sensors, in particular cameras) (only two are shown for simplicity), which extend their observation range over a part of the deflection units onto a surface (in particular the powder bed). The optical axes of the observation path and processing path (i.e. irradiation beam path of the irradiation beam used to irradiation the material, which may be a powder) may be the same or may be at an angle≠0 to each other, as shown in FIG. 7. The system determines the position of points of impact to each other on the surface by a method comprising the following steps.

A deflection unit $D_1$ is used to deflect the observation beam of a camera $C_1$ to a surface A on a powder bed, solidified material or a test sample (e.g. plate or surface of a coater). The plane of impact can, but need not, correspond to the building plane.

The energy from sources $S_2$ to $S_N$ (only two sources of the N sources $S_1$ to $S_N$ are shown for simplicity) is deflected via deflection units $D_2$ to $D_N$ to positions $P_2$ and $P_N$ within area A. In the simplest case as simple points, but patterns can also be created (by, e.g., beam shaping or fast scanner movement). In some examples, the deflection unit $D_1$ itself can also emit a beam, which creates either a point or a pattern on the exposure plane.

The material is irradiated by the energy beams of the $S_2$-$S_N$ (or $S_1$) sources simultaneously or successively and one or more images are taken during and/or after the irradiation. The detected radiation is either the reflected laser radiation, the thermal induced heat radiation or the emitted process light, or any combination thereof. The irradiated material can, but does not have to melt during the process.

Within the surface A and/or on the surface A, a calibration mark is provided (in some examples a plurality of calibration marks are provided. A characteristic of the calibration mark(s) may be detected via the sensor (e.g. camera $C_1$). Such characteristic may, for example, include one or more of a geometric characteristic or property (like the shape) and the position of the calibration mark. The calibration mark may be arranged or generated within the powder bed, on the substrate plate, on a reference plate or next to the powder bed, or any combination thereof. Particularly preferably, the reference mark may be arranged next to the powder bed in and/or on the gap between the powder bed (or the substrate plate if no powder is spread on its surface) and the process chamber floor. It is clear that more than one calibration mark may be arranged within the system.

The relative positions $P_2$ to $P_N$ are determined from recorded, i.e. sensed data. For this purpose, single images can be superimposed on each other, if necessary. The different positions P are assigned to the beams by the use of different patterns per beam, correlation with an exposure time (corresponding single image) or by a spatial arrangement to each other, i.e. assignment by an area in which the position is expected. In some examples, $P_1$ can also be determined in addition to the other positions. The advantage of not including $P_1$ in the determination may be that the focus of the observation area can be adjusted independently of a beam emitted, i.e. deflected via the deflection unit $D_1$. Nevertheless, a beam can be emitted via $D_1$, which then, however, is preferably only used to indicate to the operator that the observation area has been positioned, i.e. only serves as information about the correct function. As mentioned above, the optical axes of the processing/irradiation beam and observation paths can have an angle therebetween which is different from zero, which angle can also be selected so large that the processing point $P_1$ lies outside the observation range. It may be particularly advantageous to adjust or arrange the paths to be at an angle so that the observation does not focus on or cover, e.g., a melt pool or generally where an irradiation beam impacts on material to be solidified.

Based on the relative positions, an image correction is made at least for the deflection units $D_2$ to $D_N$. Here concrete positions to the observation area can be determined, and/or distances of the points/patterns to each other (preferably, even without determining absolute positions).

Just for clarification, it is noted that $S_2$-$S_N$ and $D_2$ to $D_N$ respectively may represent any subset of energy beams and deflection units.

For the purpose of determining distances of the points/patterns to each other (without determining absolute positions), the individual beams may be identified by means of an image evaluation algorithm and distances may be determined without determining the absolute position on the powder bed or in the observation area. Therefore, not the positions may be compared with expected positions, but only the expected offset. This may have the advantage that the sensor does not have to be finely calibrated in the beam path of the optics over which the observation range is deflected, since the position of the observation range itself is not taken into account.

A rough calibration of the sensor may be sufficient, which only ensures that all points to be detected are located in the observation range. Preferably, therefore, a pattern to be projected is chosen which has an extension in at least one dimension, so that an orientation for a coordinate system (x,y) can be determined. In this way, not only the correct offset may be detected, but also any angular deviation of the respective scanner coordinate systems (e.g. if x of scanner 2 is not parallel to x of scanner 3). A particularly suitable pattern is e.g. shown in FIG. 2*c*.

Additionally, the position of reference features, especially said calibration marks, in the imaging area and/or their distance to positions $P_2$ to $P_N$ can be determined. This is particularly useful when projected onto a test object/sample, but a reference feature can additionally or alternatively be a grid with a specific calibrated position projected onto the irradiation plane (e.g. powder bed).

If no reference features are recorded and the beam positions or the deflection units can only be calibrated relative to each other, e.g. a beam position of a deflection unit can be defined as a reference and the determined distances compared with nominal distances. Alternatively or additionally, all positions are first compared with each other and then the position with the least deviation of the target distances to the other positions of the other beams is defined as the reference. As a further alternative, or additionally, a position that deviates least from the expected position in the observation area can also be selected as a reference. If an absolute reference is acquired, all positions can be compared directly to this reference or the comparison is first made to a reference position and then compared to the reference feature. The choice of the reference position is then irrelevant due to the later comparison to the absolute feature.

The described procedure can be repeated on additional surfaces, i.e. the observation area and beam positions are moved to a different location.

Further M cameras are deflected by further scanners and the procedure described above may be repeated, also for other subsets of the N deflection units. In particular, the position $P_1$ to other beam positions can then be determined. If the system comprises more than one sensor (e.g. a plurality of cameras), the procedure may also be executed simultaneously for different subsets of the N deflection units.

The following examples are also encompassed by the present disclosure and may fully or partly be incorporated into embodiments:

1. A device for calibrating an irradiation system of an apparatus for producing a three-dimensional workpiece, the irradiation system comprising an irradiation unit for selectively irradiating an irradiation beam onto an irradiation plane, wherein the device comprises:

a control unit configured to control the irradiation system to irradiate the irradiation beam onto the irradiation plane, and an optical detection unit coupled to the control unit, wherein the optical detection unit comprises an optical detector and an objective lens for optically detecting a portion of the irradiation plane, wherein the optical detection unit is configured to detect a position of a spot of the irradiation beam on the irradiation plane based on the irradiation beam being scattered off the irradiation plane, wherein the optical detection unit is configured to output a signal to the control unit in response to the optical detection unit detecting the position of the spot of the irradiation beam on the irradiation plane, and wherein the control unit is configured to control the irradiation system based on the signal output from the optical detection unit to the control unit.

2. A device according to example 1, further comprising a focal distance adjustment unit for adjusting a focal distance of the optical detection unit.

3. A device according to example 1 or 2, wherein a focal point of the objective lens is adjustable.

4. A device according to any preceding example, wherein the device further comprises a second lens having an adjustable focal length.

5. A device according to any preceding example, further comprising an image processing unit configured to stitch together multiple images of parts of the irradiation plane taken by the optical detection unit for obtaining an image of an entire surface of the irradiation plane.

6. A device according to any preceding example, further comprising a said irradiation system, wherein the optical detection unit is arranged off-axis with respect to the irradiation beam.

7. An apparatus for producing a three-dimensional workpiece using an additive layer manufacturing technique, the apparatus comprising:

an irradiation unit for selectively irradiating an irradiation beam onto an irradiation plane, and an optical detection unit configured to optically detect a position of a spot of the irradiation beam on the irradiation plane, wherein the optical detection unit is arranged off-axis with respect to an irradiation beam path of the irradiation beam from the irradiation unit to the irradiation plane for detecting light stemming from the irradiation beam being scattered off the irradiation plane.

8. An apparatus according to example 7, wherein the irradiation unit is configured to irradiate a first said irradiation beam and a second said irradiation beam onto the irradiation plane, wherein the optical detection unit is configured to optically detect a first said position of a first said spot of the first irradiation beam on the irradiation plane and a second said position of a second said spot of the second irradiation beam on the irradiation plane, wherein the apparatus further comprises a calibration unit coupled to the optical detection unit and the irradiation unit, and wherein the calibration unit is configured to calibrate the irradiation unit for controlling the first irradiation beam and the second irradiation beam relative to each other based on the optical detection, by the optical detection unit, of the first spot and the second spot on the irradiation plane.

9. An apparatus according to example 7, further comprising:
a first scanner for scanning the first irradiation beam over the irradiation plane based on a first irradiation beam pattern, and
a second scanner for scanning the second irradiation beam over the irradiation plane based on a second irradiation beam pattern,
wherein the optical detection unit is configured to:
detect the first irradiation beam pattern and the second irradiation beam pattern,
compare the first irradiation beam pattern with the second irradiation beam pattern, and
output a comparison signal based on said comparison, and
wherein the apparatus is configured to calibrate the irradiation unit based on the comparison signal for controlling the first irradiation beam and the second irradiation beam.

10. An apparatus according to example 9, wherein the comparison of the first irradiation beam pattern with the second irradiation beam pattern is performed using one or more resolution enhancing software algorithms.

11. An apparatus according to example 9 or 10, wherein the comparison of the first irradiation beam pattern with the second irradiation beam pattern comprises determining (i) a trajectory of an irradiation intensity-weighted mean value of the first and second irradiation beams and/or (ii) a peak intensity of the first and second irradiation beams.

12. An apparatus according to any one of examples 7 to 11, wherein a focal length of the optical detection unit is adjustable, and wherein the optical detection unit is configured to detect the spot of the irradiation beam on the irradiation plane in multiple focal planes for the same viewing direction of the optical detection unit.

13. An apparatus according to example 12, wherein the optical detection unit is configured to determine a focused area of an image of the irradiation plane in each of the multiple focal planes, and wherein the apparatus is configured to determine three-dimensional information in relation to a surface of the irradiation plane based on the determined focused area of each of the multiple focal planes.

14. An apparatus according to example 12 or 13, wherein the optical detection unit is configured to generate a hyperfocal image of the irradiation plane.

15. An apparatus according to any one of examples 7 to 14, further comprising an image processing unit configured to stitch together multiple images of parts of the irradiation plane taken by the optical detection unit for obtaining an image of an entire surface of the irradiation plane.

16. An apparatus according to example 15, wherein the irradiation unit is configured to irradiate an irradiation spot and/or pattern onto the irradiation plane, and wherein the image processing unit is configured to align images in which the irradiation spot and/or pattern are visible based on aligning the irradiation spot and/or pattern in the respective ones of said images.

17. An apparatus according to any one of examples 7 to 16, comprising a scanner for scanning the irradiation beam and/or an irradiation spot and/or pattern onto the irradiation plane, wherein the apparatus is configured to determine a three-dimensional surface of the irradiation plane based on a position of the scanner relative to the irradiation unit using triangulation.

18. An apparatus according to example 17, comprising a plurality of scanners, and wherein the apparatus is configured to determine the three-dimensional surface of the irradiation plane based on the position of each of the scanners relative to the irradiation unit using triangulation.

19. An apparatus according to example 18, wherein the apparatus is configured to determine a height of the irradiation plane based on the position of each of the scanners and a point of intersection of irradiation beams being scanned over the irradiation plane by the respective scanners using triangulation.

20. An apparatus according to any one of examples 7 to 19, wherein the irradiation unit is configured to irradiate an elongated and/or stripe pattern onto the irradiation plane, and wherein the optical detection unit is configured to detect a position of the elongated and/or stripe pattern on the irradiation plane.

21. A device according to any one of examples 1 to 6 or an apparatus according to any one of examples 7 to 20, further comprising a reference plate comprising one or more markings with known positions, wherein the device or apparatus is configured to:
determine a position, in particular in a first direction, of a said marking with respect to a pattern projected, in particular generally in a second direction which is different from the first direction, by a scanner onto said marking, and
calibrate said scanner based on the determined position.

22. A device or apparatus according to example 21, wherein the pattern comprises one or more lines stemming from an irradiation beam being scanned by the scanner over the reference plate.

No doubt many other effective alternatives will occur to the skilled person. It will be understood that the invention is not limited to the described embodiments and example implementations and encompasses modifications apparent to those skilled in the art and lying within the scope of the claims appended hereto.

The invention claimed is:

1. A system for producing a three-dimensional workpiece using an additive layer manufacturing technique, the system comprising:
a plurality of deflection units, wherein at least one of the deflection units is configured to divert an optical path towards a surface of the system and/or a material solidified and/or to be solidified by the system using the additive layer manufacturing technique, and
a sensor configured to detect the surface and/or the material via a first one of the deflection units, one or more irradiation devices configured to generate, for projection onto the surface and/or the material, two or more irradiation spots and/or patterns, wherein a first one of the irradiation spots and/or patterns is deflectable via a second one of the deflection units onto the surface and/or the material, and a second one of the irradiation spots and/or patterns is deflectable via a third one of the deflection units onto the surface and/or the material, and/or
the system comprises at least one calibration mark in a detection range of the sensor detecting the surface and/or the material via the first one of the deflection units, and wherein the system is configured to:
detect, via the sensor detecting the surface and/or the material via the first one of the deflection units, a first characteristic, on the surface and/or the material, of the first irradiation spot and/or pattern, detect, via the sensor detecting the surface and/or the material via the first one of the deflection units, a second characteristic of the second irradiation spot and/or pattern, and/or detect, via the sensor detecting the surface and/or the material via the first one of the deflection units, a third characteristic of the calibration mark;

and wherein the system is further configured to:

determine a correlation of the first characteristic and the second characteristic and/or the first characteristic and the third characteristic, and calibrate the second one of the deflection units and/or the third one of the deflection units based on the determined correlation of the first characteristic and the second characteristic on the surface and/or the material, and/or calibrate the second one of the deflection units based on the determined correlation of the first characteristic on the surface and/or the material and the third characteristic, wherein the system is configured to calibrate the plurality of deflection units using a reference position of one of said spots and/or patterns on the surface and/or the material, wherein the reference position is based on one or more of:

a first position of a first spot and/or pattern with a lowest first deviation from a target mean relative distance to other positions of other spots and/or patterns; and a second position having a lowest second deviation from a target position on the surface and/or the material.

2. The system as claimed in claim 1, wherein the system is configured to correlate the first characteristic or the second characteristic with an irradiation beam stemming from one of the one or more irradiation devices based on one or more of:

a geometry and/or a dimension and/or an intensity and/or an intensity distribution of the spot and/or pattern being unique to a corresponding, respective one of the irradiation devices and/or corresponding, respective one of the deflection units, a time period over which the irradiation beam is generated, and a position of an area or part of the surface and/or the material on which the said spot and/or the said pattern is expected.

3. The system as claimed in claim 1, wherein one of the irradiation devices is configured to generate a third irradiation spot and/or pattern for projection onto the surface and/or the material via the first one of the deflection units, and wherein an observation path for observing the surface and/or the material by the sensor and an irradiation beam path of said third irradiation spot and/or pattern form an angle therebetween, and wherein the angle is different from zero.

* * * * *